United States Patent [19]
Windawi et al.

[11] Patent Number: 4,503,162
[45] Date of Patent: Mar. 5, 1985

[54] CATALYST SYSTEMS FOR THE CONVERSION OF GASES

[75] Inventors: Hassan Windawi, Arlington Heights; Gene R. Grieger, Rolling Meadows; Warren R. Oakdale, Morton Grove, all of Ill.

[73] Assignee: UOP Inc., Des Plaines, Ill.

[21] Appl. No.: 591,731

[22] Filed: Mar. 21, 1984

Related U.S. Application Data

[63] Continuation-in-part of Ser. No. 498,624, May 27, 1983, abandoned.

[51] Int. Cl.$^3$ .................. B01J 21/04; B01J 23/72; B01J 23/78; B01J 23/84
[52] U.S. Cl. ................... 502/174; 502/331; 423/363; 518/713
[58] Field of Search ............... 502/174, 330, 331

[56] References Cited

U.S. PATENT DOCUMENTS

4,144,198  3/1979  Miya et al. ............. 502/331

Primary Examiner—W. J. Shine
Attorney, Agent, or Firm—William H. Page, II; Raymond H. Nelson

[57] ABSTRACT

Catalyst systems for the conversion of gases into useable products will comprise an iron-containing compound consisting essentially of elemental iron and a minimal amount of iron oxide. The system will also include the presence of from about 0.5% to about 4% by weight of elemental copper, from about 0.5% to about 4% by weight of aluminum oxide, from about 0.2% to about 5.0% by weight of vanadium oxide and from about 0.5% to about 5.0% by weight of a potassium-containing compound such as potassium oxide. This system will exhibit greater activity in the conversion of nitrogen and hydrogen to form ammonia, hydrogen and carbon monoxide to produce hydrocarbons, or water and carbon monoxide to form carbon dioxide and hydrogen.

11 Claims, No Drawings

CATALYST SYSTEMS FOR THE CONVERSION OF GASES

CROSS REFERENCE TO RELATED APPLICATION

This application is a continuation-in-part of our co-pending application Ser. No. 498,624 filed May 27, 1983, now abandoned all teachings of which are incorporated herein by reference thereto.

BACKGROUND OF THE INVENTION

Heretofore, commercial catalysts which have been employed in the conversion of gases into useful products have generally been composed of an iron-containing compound such as iron oxide which may be in the form of a magnetite. The iron oxide catalysts have been promoted in either a structural or chemical manner to enhance the stability of the catalyst, thus permitting the catalyst to be used in these reactions to obtain the desired products at an optimum value. One form of structural promotion of the iron-containing catalyst involves the addition of a component such as alumina which may be in various forms, such as alpha-alumina, eta-alumina, gamma-alumina, etc. to form a spinel structure with the magnetite to enhance and stabilize the catalyst possessing a high surface area. The addition of the promoter substance enhances the separation of the magnetite particles and thus will minimize any possible sintering effect which may occur during the reduction treatments as well as any sintering which may occur during the operation of the chemical reaction utilizing such catalysts. Another example of promoting the iron-containing catalyst is in a chemical manner such as the addition of an alkali material such as sodium oxide, potassium oxide, lithium oxide, barium oxide, calcium oxide, magnesium oxide, etc. or the carbonates thereof which, in essence, increases the basicity of the iron.

However, a disadvantage or drawback which occurs in many instances when utilizing a structural or chemical promoter is that an interaction develops between the structural and chemical promotor and the resulting combined aggregate separates and segregates from the iron catalyst, thus leading to an inhomogeneity in the distribution of the promoters with a concurrent loss in optimization of the catalyst activity. The loss of optimization further results in a decrease in the percentage of conversion of the gases with a corresponding decrease in the yield of the desired useable products.

As will hereinafter be shown in greater detail, it has now been discovered that a novel catalyst system may be prepared which, when used in reactions involving the conversion of gases, will result in the obtention of desirable yields of utilizable products.

BRIEF SUMMARY OF THE INVENTION

This invention relates to novel catalyst systems which may be used in the conversion of gases to useable products. More specifically, the invention resides in a novel catalyst system comprising an iron-containing compound containing promoting amounts of aluminum, copper, vanadium and potassium whereby the catalyst system may be used in gas conversion reactions to obtain a desirable yield of useable products.

The conversion of gases to useable products occurs in a wide variety of reactions. For example, one type of gas conversion reaction is employed by reacting nitrogen and hydrogen to obtain ammonia. Ammonia, of course, is widely used in the chemical industry, such as in refrigeration, as a fertilizer, in rubber vulcanization, in the manufacture of other chemicals, in water treatment, etc.

Another type of gas conversion reaction is found in the Fischer-Tropsch synthesis process in which hydrogen and carbon monoxide are passed over a catalyst to produce hydrocarbons or their oxygenated derivatives. Yet another form of gas conversion is in the water-gas shift reaction in which water and carbon monoxide are reacted at an elevated temperature in the vapor phase to form carbon dioxide and hydrogen.

It is therefore an object of this invention to provide a catalyst system which may be employed in gas conversion reactions which will maintain a high degree of activity for a relatively extended period of time.

A further object of this invention resides in a catalyst system which may be utilized to obtain desirable yields of useable products from the conversion gases.

In one aspect an embodiment of this invention resides in a catalyst system for the conversion of gases into useable products which comprises an iron-containing compound admixed with elemental copper and aluminum-, potassium- and vanadium-containing compounds.

A specific embodiment of this invention is found in a catalyst system comprising iron oxide and elemental iron admixed with elemental copper in an amount in the range of from about 0.5 to about 4%, aluminum oxide in an amount in the range of from about 0.5 to about 4.0%, potassium oxide or carbonate in an amount in the range of from about 0.5 to about 5.0% and vanadium oxide in an amount in the range of from about 0.2 to about 5.0%.

Other objects and embodiments will be found in the following further detailed description of the present invention.

DETAILED DESCRIPTION OF THE INVENTION

As hereinbefore set forth, the present invention is concerned with a catalyst system which may be employed in various processes involving the conversion of gases to useable products, the catalyst system comprising an iron-containing compound admixed with elemental copper as well as aluminum-, potassium- and vanadium-containing compounds. It has now been discovered that by employing a catalyst containing all of the above components, it is possible to obtain greater yields of the desired product. The catalyst system in which elemental iron with some iron oxide being present comprises the main component of the system. The system will be promoted both structurally as well as chemically and thus result in a catalyst system which possesses a higher degree of activity than is present in presently utilized commercial catalysts. In the present catalyst system, the vanadium-containing compound which is present will act as a structural promoter, while the potassium-containing compound which is present will act as a chemical promoter for the system.

The catalyst system of the present invention may be prepared preferably in a batch type operation by co-precipitating iron, aluminum and copper. The coprecipitation of these three components of the catalyst system is effected by utilizing soluble salts of the metals such as ferric chloride, ferrous chloride, ferric nitrate, ferrous nitrate, ferric bromide, ferrous bromide, aluminum chloride, aluminum nitrate, aluminum bromide, cuprous chloride, cupric chloride, cuprous nitrate, cupric nitrate, cuprous bromide, cupric bromide. It is to be understood that other soluble salts of iron, aluminum and copper may also be employed, although not necessarily with equivalent results. The aforesaid salts of iron, aluminum and copper are dissolved in a suitable solvent which may be inert to the reaction; examples of solvents which may be employed will include water, alcohols such as methanol, ethanol, propanol, etc., paraffins such as pentane, hexane, cyclohexane, methylcyclohexane, aromatic hydrocarbons such as benzene, toluene, the xylenes, tetrahydrofuran, etc. After dissolving the salts which are present in an amount so that the finished catalyst system will contain from about 0.5 to about 4.0% of aluminum oxide and from about 0.5 to about 4.0% of elemental copper, the solution is neutralized by the addition of a neutralizing agent such as sodium hydroxide, potassium hydroxide, lithium hydroxide, ammonium hydroxide, sodium carbonate, potassium carbonate, lithium carbonate, ammonium carbonate, etc. to a pH of about 7, the neutralization of the solution acting to promote the precipitation of the compounds. After formation of the precipitates, it is then rinsed with deionized water to remove the alkaline material and dried, preferably at a temperature slightly in excess of 100° C. The precipitate is then calcined in an air atmosphere at a temperature in the range of from about 350° C. to about 550° C. for a period of time which may range from about 2 to about 24 hours.

The calcined compound comprising ferric oxide containing the aluminum-containing compound and copper-containing compound is then impregnated by the addition of a solution of a vanadium-containing compound such as vanadium oxychloride, ammonium metavanadate, etc. After permitting the impregnation to proceed for a predetermined period of time sufficient to add the vanadium to the calcined composite in an amount in the range of from about 0.2 to about 5.0% (based on the weight of the oxide), the excess vanadium-containing solution is removed, the impregnated composite is rinsed, dried and again calcined at a temperature in the range hereinbefore set forth. Alternatively, if so desired, the vanadium in the form of a solution of the type hereinbefore set forth may be added during the precipitation step of the composite prior to the rinsing, drying and calcination, thus eliminating a second step of the process.

The vanadium-impregnated composite may then be further impregnated with a solution of a soluble potassium compound such as potassium hydroxide, potassium carbonate, potassium nitrate, etc., said impregnation being effected in a manner similar to that set forth when employing an impregnation step for the addition of vanadium. The impregnation with the potassium solution is effected for a period of time sufficient to deposit from about 0.5 to about 5.0% of potassium on the vanadium-impregnated composite. Alternatively, it is also contemplated within the scope of this invention that the impregnation of the composite may be effected prior to the first calcination step of the process. However, in all instances a final calcination step at a temperature in the range of from about 350° to about 550° C. is required. After calcination of the composite, the catalyst system is activated by treating the composite in a hydrogen atmosphere effected by flowing hydrogen over the composite while heating to a temperature in the range of from about 350° to about 450° C. for a period of time ranging from about 2 to about 24 hours. The final catalyst system will comprise an iron-containing compound as the main component thereof, said iron-containing compound consisting primarily of elemental iron, although some iron oxide will also be present due to the incomplete reduction of the iron to the elemental state. The other components of the catalyst system will be present in the form of elemental copper, aluminum oxide, vanadium oxide, while the potassium-containing compound will be present in the form of either potassium oxide, potassium carbonate or potassium hydroxide.

The catalyst system of the present invention may be used in various reactions relating to the conversion of gases to useable products. As hereinbefore set forth, one type of gas conversion process which may employ the catalyst system comprises a water-gas shift reaction in which water and carbon monoxide are reacted in the presence of the catalyst to form carbon dioxide and hydrogen. The reaction conditions which are employed in this process will include temperatures in the range of from about 250° to about 400° C. or more and pressures ranging from atmospheric up to about 100 atmospheres. Likewise, the catalyst system may also be employed in a Fischer-Tropsch reaction in which carbon monoxide and hydrogen are reacted to form hydrocarbons such as paraffins. The reaction conditions which are employed in this type of reaction will include temperatures in the range of from about 200° to about 400° C. and pressures which may range from about atmospheric up to about 100 atmospheres, the mole ratio of hydrogen to carbon monoxide being in a range of from about 1:2 to about 6:1 moles of hydrogen per mole of carbon monoxide. In addition to these gas conversion processes, another type of reaction which may be effected utilizing the catalyst system of the present invention comprises an ammonia synthesis reaction in which nitrogen and hydrogen are reacted at reaction conditions which include a temperature in the range of from about 500° to about 700° C. and a pressure in the range of from about 100 to about 1000 atmospheres.

As will hereinafter be shown in greater detail, when employing the catalyst system of the present invention, it is posssible to effect the reaction in such a manner so that a greater yield of useable products with a higher percentage conversion of gases is obtained than when using other catalyst systems which do not contain both a structural promoter such as a vanadium-containing compound as exemplified by vanadium oxide and a chemical promoter such as a potassium-containing compound as exemplified by potassium oxide, potassium carbonate or potassium hydroxide.

The following examples are given to illustrate the novel catalyst systems of the present invention and other uses thereof in gas conversion reactions.

EXAMPLE I

A catalyst system was prepared by placing ferric nitrate, aluminum nitrate and cupric nitrate in a reaction vessel along with water. The solution was stirred and thereafter sodium carbonate solution was added to the nitrate mixture at a temperature of about 60° C., the pH of the solution being about 7. After allowing the ensuing precipitation to stand for a predetermined period of time, the precipitate was separated from the solution, rinsed with water to remove any residual sodium and dried at a temperature of about 110° C. Following this, the solid ferric oxide containing 2% aluminum and 2% copper based on the iron was calcined in an oven under a flowing air atmosphere at a temperature of 400° C.

The iron oxide containing aluminum oxide and copper oxide prepared according to the above paragraph was then impregnated with a vanadium-containing solution by treating 5 grams of the iron oxide composite with 25 ml of a dilute vanadium solution consisting of vanadium oxychloride diluted in methanol at a concentration of 2 vol. percent. The impregnation was allowed to proceed for a period of 20 minutes following which the impregnated composite was vacuum dried and subsequently calcined for a period of 24 hours at a temperature of 400° C. To complete the preparation of the novel catalyst system of the present invention, the vanadium-impregnated iron composite containing the aluminum compound and copper compound was treated with 1.2 ml of a 1M solution of potassium triethylborohydride dissolved in tetrahydrofuran. As in the preceding step, the impregnation was allowed to proceed for a period of 20 minutes at room temperature, the catalyst composite was then vacuum dried and thereafter calcined at a temperature of 400° C. for a period of 24 hours in an air atmosphere. The resulting catalyst system was activated by reduction, the reduction being effected by subjecting the catalyst system to a stream of flowing hydrogen while being heated at a temperature of 400° C. for a period of 16 hours. The finished catalyst system comprised a mixture of elemental iron with a minimal amount of iron oxide and contained 2% by weight of aluminum in the form of the oxide, 2% by weight of elemental copper, 0.5% by weight of vanadium in the form of the oxide, and 1% by weight of potassium in the form of the oxide based on the iron.

To illustrate the efficiency of the catalyst system of the present invention, two other catalyst systems were prepared. In one system the iron-containing compound which also contained aluminum oxide and elemental copper was prepared in a manner similar to that hereinbefore set forth, said system being impregnated only with potassium triethylborohydride dissolved in tetrahydrofuran, the impregnation of the composite being effected in a manner similar to that hereinbefore set forth. The second catalyst system was prepared by treating the iron-containing catalyst which also contained aluminum oxide and elemental copper with a solution of vanadium oxychloride dissolved in methanol, the remaining steps also being similar to those which were used to prepare the catalyst system of the present invention. It is to be noted that the first catalyst system herein described did not contain any vanadium oxide, while the second catalyst system did not contain any potassium oxide.

EXAMPLE II

The three catalysts which were prepared according to the method set forth in Example I above were tested for water-gas shift activity by loading tubular reactors with 0.4 gram of each of the catalysts previously described. Following the loading of the catalysts, they were activated by being subjected to a reduction in the presence of hydrogen for a period of 16-24 hours at 400° C. Following this, the reaction feed which consisted of a 1:1 ratio of water to carbon monoxide was charged to the reactor at a gaseous hourly space velocity of 3200 hrs.$^{-1}$, the concentration of the carbon monoxide being maintained at about 25%. The reactions were performed at atmospheric pressure and temperatures ranging from about 225° to about 365° C. The products which were recovered were analyzed by gas chromatography. The results of these tests are set forth in Table I below in which the catalyst system of the present invention was labeled "A", the catalyst system promoted only by the presence of potassium was labeled "B", and the catalyst system promoted only by the presence of vanadium was labeled "C".

TABLE 1

| Temp. °C. | CO Conversion % | | |
|---|---|---|---|
| | A | B | C |
| 250 | 6 | 2 | 0 |
| 260 | — | 3 | 0 |
| 270 | 11 | 3 | 0 |
| 280 | 12 | 3.5 | 0 |
| 290 | 14.5 | 7 | 0 |
| 325 | 32 | — | 0 |
| 350 | 35 | — | 0 |

It is readily apparent from the results set forth in the above table that the catalyst system of the present invention exhibited a greater degree of activity as a water-gas shift catalyst than did other catalysts which did not contain all of the components of the desired catalyst.

EXAMPLE III

In this example, a catalyst system of the present invention was prepared in a totally aqueous system. The catalyst base was prepared by admixing aluminum nitrate and cupric nitrate in a reaction vessel in the presence of water. The solution was stirred, heated to a temperature of 60° C. and thereafter a sodium carbonate solution was added thereto to assist in the precipitation of the metals. Upon completion of the desired residence time, the precipitate which contained 2% by weight of aluminum and 2% by weight of copper, the remainder being ferric oxide, was separated from the solution and rinsed with water to remove residual sodium.

A solution consisting of 0.88 gram of ammonium vanadate, 1.89 grams of oxalic acid and 26.4 mL of water was mixed with the gel which consisted of 400 grams of the iron precipitate solution for a period of 15 minutes. Following this, the gel was dried on a steam bath for a period of 2 hours accompanied by intermittent mixing at spaced intervals of 15 minutes, thereafter the gel was subsequently oven dried for a period of 12 hours at a temperature of 110° C. and screened to −200 mesh. The solid was then placed in a 300 mL round bottom flask and 0.75 gram of potassium carbonate dissolved in 80 mL of distilled, deionized water was added. Vacuum impregnation was effected on a rotary evaporator at a temperature of 70° C., following which the catalyst system was calcined at a temperature of 400° C. for 24 hours in an air atmosphere.

The resulting catalyst system was reduced by treatment with hydrogen in a manner hereinbefore set forth in Example I above to afford a catalyst system comprising elemental iron containing a minor amount of iron oxide and also containing 2% by weight of aluminum in the form of the oxide, 2% by weight of elemental copper, 1% by weight of vanadium in the form of the oxide and 1% by weight of potassium in the form of the oxide based upon the weight of the iron.

EXAMPLE IV

The catalyst which was prepared according to Example III above was utilized in a slurry reactor to convert synthesis gas, that is, carbon monoxide and hydrogen, in a Fischer-Tropsch synthesis to obtain heavy hydrocarbons which could be used for the production of diesel fuel. Approximately 25 grams of the catalyst was placed in a slurry reactor in 250 grams of a $C_{32}$ slurry medium which was heated to a temperature of 265° C. The feedstock in a mole ratio of 0.56:1 moles of hydrogen per mole of carbon monoxide was charged to the reactor at a gaseous hourly space velocity of 101 hrs.$^{-1}$. The conversion proceeded at a pressure of 400 pounds per square inch gauge (psig) for a period of 5 hours, at the end of which time the hydrocarbon products were analyzed. The analysis disclosed that the hydrocarbon compositions consisted of 71% by weight of hydrocarbons greater than $C_{12}$.

In contradistinction to this, a catalyst system which comprised iron oxide containing only copper and aluminum which was chemically promoted by potassium, but was not structurally promoted by the addition of vanadium, when used in a Fischer-Tropsch synthesis reaction, only yielded 55% by weight of a fraction containing hydrocarbons having more than 12 carbon atoms.

We claim as our invention:

1. A catalyst system for the conversion of gases into useable products which comprises an iron-containing compound admixed with elemental copper and aluminum-, potassium- and vanadium-containing compounds.

2. The catalyst system as set forth in claim 1 in which said iron-containing compound is iron oxide.

3. The catalyst system as set forth in claim 1 additionally containing elemental iron.

4. The catalyst system as set forth in claim 1 in which said aluminum-containing compound is aluminum oxide.

5. The catalyst system as set forth in claim 1 in which said potassium-containing compound is potassium oxide.

6. The catalyst system as set forth in claim 1 in which said potassium-containing compound is potassium carbonate.

7. The catalyst system as set forth in claim 1 in which said vanadium-containing compound is vanadium oxide.

8. The catalyst system as set forth in claim 1 in which said elemental copper is present in said catalyst system in an amount in the range of from about 0.5% to about 4% by weight of said catalyst system.

9. The catalyst system as set forth in claim 4 in which said aluminum oxide is present in said catalyst system in an amount in the range of from about 0.5% to about 4.0% by weight of said catalyst system.

10. The catalyst system as set forth in claim 5 in which said potassium oxide is present in said catalyst system in an amount in the range of from about 0.5% to about 5.0% by weight of said catalyst system.

11. The catalyst system as set forth in claim 7 in which said vanadium oxide is present in said catalyst system in an amount in the range of from about 0.2% to about 5.0% by weight of said catalyst system.

* * * * *